(12) United States Patent
Rolf et al.

(10) Patent No.: US 9,491,419 B2
(45) Date of Patent: Nov. 8, 2016

(54) METHOD AND SYSTEM FOR CONTROLLING A DEVICE

(71) Applicant: AXIS AB, Lund (SE)

(72) Inventors: Magnus Rolf, Malmö (SE); Johan Adolfsson, Södra Sandby (SE); Niklas Hansson, Hörby (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/794,261

(22) Filed: Jul. 8, 2015

(65) Prior Publication Data

US 2016/0014381 A1    Jan. 14, 2016

(30) Foreign Application Priority Data

Jul. 9, 2014   (EP) ..................................... 14176250

(51) Int. Cl.
*H04N 7/18*   (2006.01)
*H04N 7/14*   (2006.01)
*H04N 5/272*  (2006.01)

(52) U.S. Cl.
CPC .............. *H04N 7/186* (2013.01); *H04N 5/272* (2013.01); *H04N 7/147* (2013.01); *H04N 7/148* (2013.01)

(58) Field of Classification Search
CPC ...... H04N 7/147; H04N 7/148; H04N 7/186; H04N 5/272
USPC ............ 307/117; 340/5.53, 5.64, 12.32, 506, 340/541, 5.61, 5.63, 5.82, 286.06; 348/14.07, 151, 156, 143; 379/102.06, 379/201.05; 455/415, 567; 725/25, 24; 375/240.01; 463/25; 717/173
See application file for complete search history.

(56) References Cited

U.S. PATENT DOCUMENTS

| | | | | | |
|---|---|---|---|---|---|
| 4,354,189 A | * | 10/1982 | Lemelson | ............. | E05B 49/006 340/10.33 |
| 4,453,161 A | * | 6/1984 | Lemelson | ............. | E05B 49/006 340/10.5 |
| 4,524,384 A | * | 6/1985 | Lefkowitz | ............. | G08B 13/00 348/156 |
| 5,872,589 A | * | 2/1999 | Morales | ................ | H04H 20/38 348/473 |
| 5,907,352 A | * | 5/1999 | Gilley | .................... | H04N 7/186 348/143 |
| 6,005,306 A | * | 12/1999 | Pickard | ............... | E05B 47/0047 307/117 |

(Continued)

*Primary Examiner* — Gerald Gauthier
(74) *Attorney, Agent, or Firm* — Volpe and Koenig, P.C.

(57) ABSTRACT

Described is a method for registering and executing instructions in a video capturing device and to a door station. The method comprises receiving at a video capturing device a signal(s) representing a first input made using an authorized device, generating a graphical representation of the received signal(s), superimposing the graphical representation onto video captured by the video capturing device and streamed to the authorized device, receiving at the video capturing device, after the signal(s) representing an input made at the authorized device have been received and graphical representations have been generated and superimposed onto video captured by the video capturing device and streamed to the authorized device, a concluding signal representing a concluding input made using the authorized device, translating, in response to said concluding input, the received signal(s) into an instruction executable by the image capturing device, and executing the instruction resulting from the translation of the signal(s).

17 Claims, 5 Drawing Sheets

(56) References Cited

U.S. PATENT DOCUMENTS

| | | | | |
|---|---|---|---|---|
| 6,466,261 B1* | 10/2002 | Nakamura | G08B 13/19634 | |
| | | | 348/151 | |
| 6,720,861 B1* | 4/2004 | Rodenbeck | G07C 9/00103 | |
| | | | 340/5.6 | |
| 6,919,918 B2* | 7/2005 | Carretero Guerrero | G07C 9/00158 | |
| | | | 348/156 | |
| 7,015,946 B2* | 3/2006 | Suzuki | H04N 7/186 | |
| | | | 348/143 | |
| 7,129,820 B2* | 10/2006 | Noma | H04L 12/10 | |
| | | | 340/12.32 | |
| 7,530,084 B2* | 5/2009 | Dawson | H04N 5/44504 | |
| | | | 345/629 | |
| 7,716,662 B2* | 5/2010 | Seiden | G06F 8/61 | |
| | | | 717/173 | |
| 7,746,223 B2* | 6/2010 | Howarter | G08B 3/10 | |
| | | | 340/13.31 | |
| 7,945,032 B2* | 5/2011 | Elberbaum | H04N 7/186 | |
| | | | 348/14.04 | |
| 8,144,853 B1* | 3/2012 | Aboujaoude | H04M 3/42374 | |
| | | | 370/352 | |
| 8,398,481 B2* | 3/2013 | Lutnick | G07F 17/3232 | |
| | | | 463/12 | |
| 9,053,587 B2* | 6/2015 | Alnadwi | G07C 9/00309 | |
| 2002/0030583 A1* | 3/2002 | Jang | G05B 19/0423 | |
| | | | 340/5.53 | |
| 2002/0154692 A1* | 10/2002 | Martin | H04N 5/44591 | |
| | | | 375/240.01 | |
| 2006/0063517 A1* | 3/2006 | Oh | H04M 3/42348 | |
| | | | 455/415 | |
| 2007/0037605 A1* | 2/2007 | Logan | G08B 13/1427 | |
| | | | 455/567 | |
| 2007/0188307 A1* | 8/2007 | Lai | H04N 7/186 | |
| | | | 340/286.06 | |
| 2008/0111684 A1* | 5/2008 | Zinser | G08B 13/196 | |
| | | | 340/541 | |
| 2008/0129498 A1 | 6/2008 | Howarter et al. | | |
| 2012/0044049 A1* | 2/2012 | Vig | G07C 9/00158 | |
| | | | 340/5.82 | |
| 2012/0044050 A1* | 2/2012 | Vig | G07C 9/00158 | |
| | | | 340/5.82 | |
| 2016/0014381 A1* | 1/2016 | Rolf | H04N 7/186 | |
| | | | 348/14.07 | |

* cited by examiner

METHOD AND SYSTEM FOR CONTROLLING A DEVICE

CROSS REFERENCE TO RELATED APPLICATION

This application claims the benefit of European Patent Application No 14176250.0 filed on Jul. 9, 2014, which is incorporated by reference as if fully set forth.

FIELD OF INVENTION

The present invention relates to a method and a system for controlling a video capturing device and controlling entry to an area.

BACKGROUND

Access control devices arranged to control access to specific areas has been around for some time. These access control devices may for instance be card readers, readers of biometric data, keypads, tag readers, audio capturing devices, video capturing devices, etc. Door stations enabling a visitor to contact a person in order to gain access to the area are usually mounted at entrances in office buildings, apartment buildings, condominiums, airports, campuses, logistic centres. In some applications one or a few door stations are connectable to a plurality of access granting indoor stations, e.g. one in each apartment. In other applications an access control centre is arranged to handle all or most access requests from a plurality of door stations. A door station may combine many features of the above mentioned access control devices. However, one important feature is to enable communication with a person enabled to allow access to the area. Early door stations included an audio capturing device and a speaker for voice communication with a person authorized to open the entrance. However, nowadays the door stations commonly include a video camera as well. The imagery from the video camera allows the person enabled to allow access to see the person requesting entrance.

Figure 1:
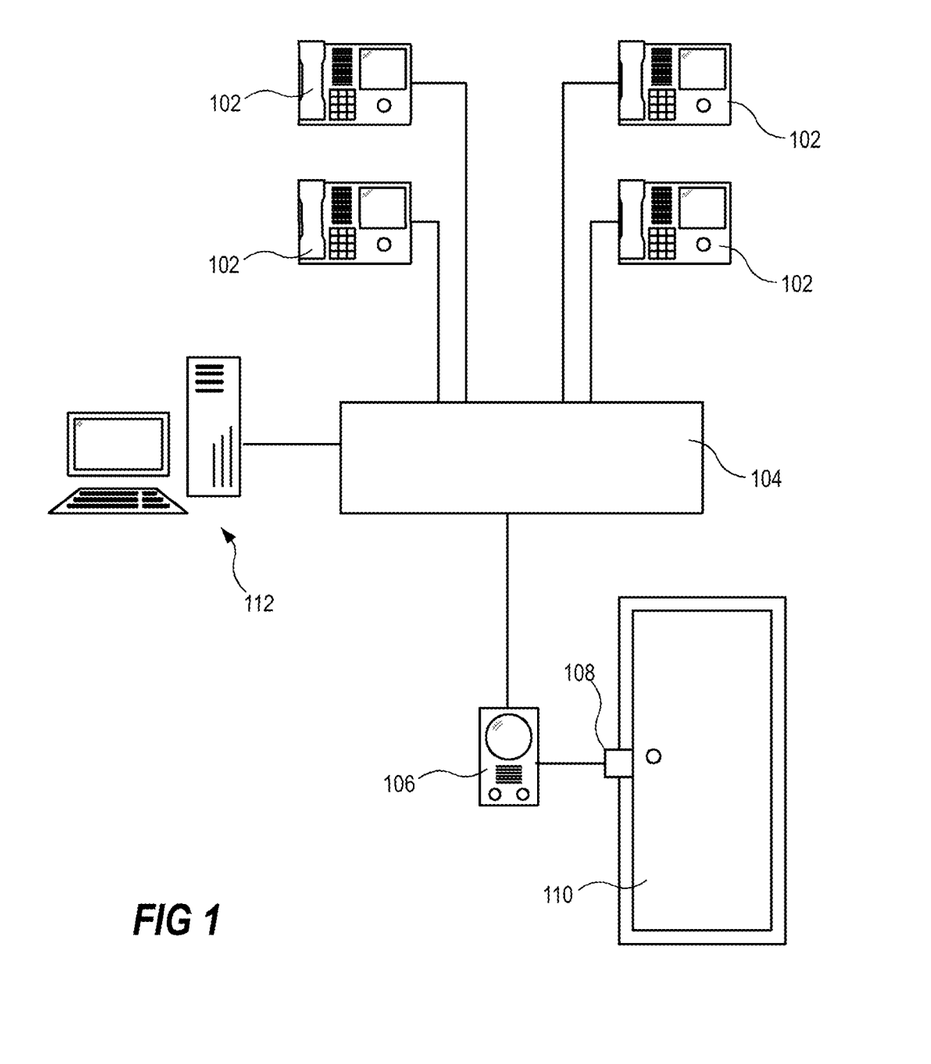
FIG. 1 is a block diagram of a traditional entry system based on an intercom system.

Traditionally an access control device like a door station is included in an intercom system, see an example in FIG. 1. In this traditional intercom a plurality of system specific indoor units 102, e.g. in the form of system specific video phones or telephones, are connected to a specialized intercom server 104. A system specific door station 106 is also connected to the intercom server 104 and to a lock mechanism 108 of a door 110. Moreover, the intercom system may include a control desk 112 enabling communication and control of the devices in the system. A person requesting entry via the door 110 connected to the door station 106 either presses a request button on the door station or inputs a request address via some input means on the door station. The request is then sent either to one or a plurality of predetermined indoor units and/or the control desk, in case of the request button being used, or to an indoor unit or the control desk being directly addressed by the user inputting a request address. At the indoor unit or the control desk a user or an operator may view the imagery captured by the door station and/or communicate verbally with the person at the door station and, if they find it appropriate, signal to the door station that the door should be unlocked and/or opened. One drawback with these traditional systems is that they require system specific indoor units, door stations, etc.

More and more systems including door stations for requesting access to areas are designed to enable use of general computers or smartphones running specific applications as indoor units or control desks for authorizing access to an area. However, these systems require the indoor unit or control desk to run an application and therefore these systems are restricted to use devices having specific operating systems.

SUMMARY

One object of the present invention is to provide a door station access system facilitating the use of various devices as authorized devices, e.g. as indoor units and/or desk units.

The object is achieved by means of a method for registering and executing instructions according to claim 1 and by means of door station according to claim 12.

More specifically, according to embodiments of one aspect of the invention, a method for registering and executing instructions in a video capturing device, comprises receiving at a communication interface of the video capturing device at least one signal representing a first input made using an authorized device, generating at the video capturing device a graphical representation of the at least one received signal, superimposing at the video capturing device the graphical representation onto video captured by the video capturing device and streamed to the authorized device, receiving at the video capturing device, after the at least one signal representing an input made at the authorized device have been received and graphical representations have been generated and superimposed onto video captured by the video capturing device and streamed to the authorized device, a concluding signal representing a concluding input made using the authorized device, translating, in response to said concluding input, the received at least one signal into an instruction executable by the image capturing device, and executing the instruction resulting from the translation of the at least one signal.

The advantage of generating graphics of a received signal at the video capturing device and then overlaying this graphic onto the video stream is that low technical requirements may be put on the devices used in controlling a video capturing device, i.e. authorized devices. Moreover, general purpose devices may be used as without requiring particular applications formed for the specific video capturing device. Moreover, the graphical representation in the return stream makes it possible for the user of the controlling device, i.e. the authorized device, to see what is inputted and get a hint if he is making correct inputs and/or if the video capturing device is receiving the correct inputs.

According to some embodiments the instruction represented by the at least one signal is an operation requested by a user of the authorized device. Hence, the device used for controlling the video capturing device, i.e. the authorized device, may instruct the video capturing device to perform an operation without the authorized controlling device having any information of the operations or instructions.

In some embodiments said received at least one signal represents a symbol inputted by an operator of the authorized device. One advantage of this embodiment is that the authorized device may be simple and may not need to perform any intelligent operations as all logic for interpreting instructions from the user of the authorized device may be arranged in the video capturing device. The symbols may also be used for authorization and/or identification of the user of the authorized device at the video capturing device.

According to some embodiments said superimposing of the graphical representation onto the captured video of the video stream includes changing pixel values for pixels forming the symbol in the video stream. One advantage is that the user of the authorized device get confirmation of each symbol inputted at the authorized device even if the authorized device is a simple device.

In some other embodiments said superimposing of the graphical representation onto the captured video of the video stream includes changing pixel values for pixels forming a visual representation of said requested operation. One advantage of this embodiment corresponds to the above advantages of enabling the user of the authorized device see the result of his input even when using a very simple authorized device.

In the method the received at least one signal and the received concluding signal may be in the form of DTMF-signals. An advantage of this feature being that many existing systems based on telephone devices may implement the method according to the invention.

Moreover, a communication session between the video capturing device and the authorized device may be a SIP-session (Session Initiation Protocol). One advantage of implementing SIP-sessions is that VoIP (Video over Internet Protocol) may be used. Further it enables software based clients, i.e. authorized devices. Moreover, it results in an open system that is enabled to operate and interact with a plurality of existing devices employing SIP.

According to some embodiments a method for controlling entry to an area, comprises said method for registering and executing instructions as described above. In the method the video capturing device is a door station, receiving, at the door station and before receiving at least one signal representing a first input made using the authorized device, an input representing a request for a communication session with an authorized device being authorized to grant entry to the area, sending to the authorized device, in response to receipt of said input representing a request, a request for setting up the communication session, and generating an entry control signal in response to the receipt of the at least one signal and the concluding signal from the authorized device. An advantage of controlling entry into areas using this method is that the method facilitates use in various different systems of entry control, both simple ones and advanced. Hence, a door station implementing the invention may be installed in existing systems without the existing systems being required to be exchanged or upgraded.

The entry control signal may be sent from the door station to a physical access controller controlling entry to said area. An advantage of this is that the door station may operate in a new access control system and simultaneously in a different, old, or existing entry control system.

In some embodiments the input that is representing a request for a communication session is generated by physical interaction with a device mounted in the door station.

The concluding signal received may be a confirmation signal received from the authorized device in response to a confirmation input made at the authorized device.

According to another aspect of the invention a door station including a camera for capturing images of a person in front of the door station, an input device for initiating communication with a controlling device, lock output configured to carry a passage lock signal, communication transceiver configured to sending video to the controlling device and receiving signals representing an instruction. The door station further includes a video overlay device configured to generate a graphical representation of a signal received via the communication transceiver and overlay the video to be sent via the communication transceiver with the generated graphical representation, and an instruction execution device configured to execute a received instruction in response to a concluding signal received at the transceiver. The advantage of generating graphics of a received signal at the video capturing device and then overlaying this graphic onto the video stream is that low technical requirements may be put on the devices used in controlling a video capturing device, i.e. authorized devices. Moreover, general purpose devices may be used as without requiring particular applications formed for the specific video capturing device. Moreover, the graphical representation in the return stream makes it possible for the user of the controlling device, i.e. the authorized device, to see the instructions inputted.

The signal representing an instruction and the concluding signal may be in the form of DTMF-signals. An advantage of this feature being that many existing systems based on telephone devices may implement the method according to the invention.

Moreover, said communication between the door station and the controlling device may be a SIP-session (Session Initiation Protocol). One advantage of implementing SIP-sessions is that VoIP (Video over Internet Protocol) may be used. Further it enables software based clients, i.e. authorized devices. Moreover, it results in an open system that is enabled to operate and interact with a plurality of existing devices employing SIP.

In some embodiments the lock output and transceiver is the same device. This is an advantage in that the door station is enabled to communicate the unlock signal initiated in one system an access system being different from the entry control system.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 2:
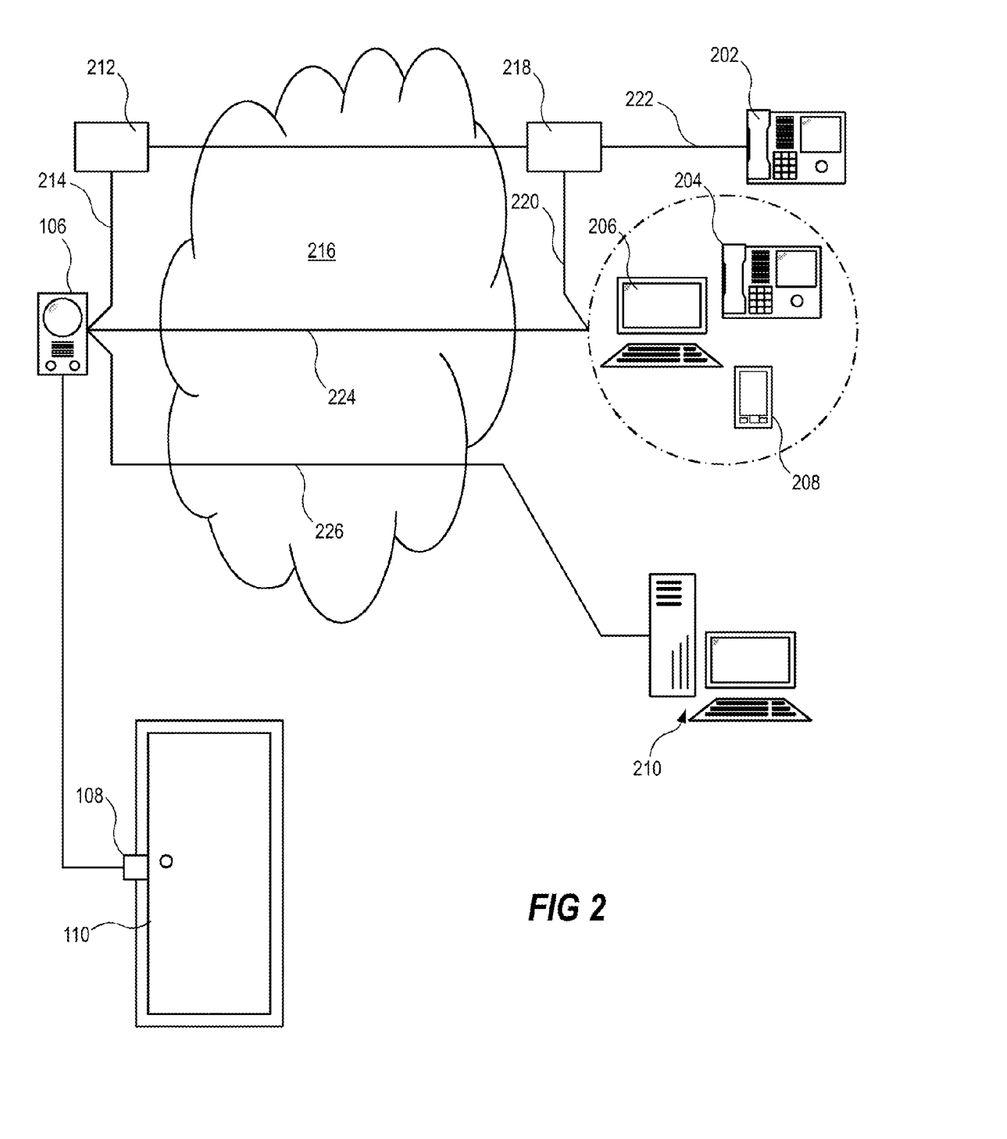
FIG. 2 is a block diagram of a modern entry system based on various communication methods that at least partly includes a computer network communication.

A door station according to one embodiment of the present invention may be arranged to communicate using various types of communication systems or various combinations of communication systems. In FIG. 2 some examples of the communication systems that may be implemented by themselves or in combination are described. The door station 106 is, as in the traditional intercom system, connected to a locking mechanism 108 controlling an entry to an area, e.g. via a door 110, a gate, turnstile, a sliding door, and other movable blocking device that may be put in an passage to prevent people from entering an area. The connection to the locking mechanism 108 may be a direct connection from the door station 106 to the locking mechanism 108, which is a design frequently used in traditional systems. However, the door station may alternatively be connected to an access controller, not shown, which is arranged in the protected area and communicates directly with the locking mechanism 108. The communication between the door station 106 and such an access controller may be using a computer network and an internet protocol. The door station 106 is arranged at an entry to the area and allows a user to request to enter into an area without any automatically readable credentials. The door station 106 may also be combined with a credential reader, i.e. a card reader, a keypad, a fingerprint reader, etc. A door station 106 may also be arranged for allowing a user to request to pass out from an area.

The request for entering into the area is sent from the door station 106 to a device, 202, 204, 206, 208, and 210 that is authorized to order the entry to the area to be opened so that the requesting person may enter into the area. Hereinafter, in the present description, the device authorized to order the entry to an area to be opened is referred to as authorized device. The authorized device may be a an analogue video telephone 202, a digital voice over internet protocol (VoIP) telephone 204 having video capabilities, a general purpose computer 206 provided with an application allowing it to allow access to the area, a smartphone 208, a mobile phone 208, a video managing server (VMS) 210 connected to the camera surveillance system. Some of the authorized devices is authorized to allow access to the area by hardware, e.g. by hardwired identity, by hard coded identity, by the position within a network, etc., others are authorized by means of the user entering authorization credentials giving the device the right to allow people pass through the passage.

The communication in the system may be b+sed on a Session Initiation Protocol (SIP) connecting the door station 106 to an SIP server 212 via a connection 214. The communication may then be relayed via a computer network 216, e.g. the Internet, a LAN, a WAN, wired, wireless, etc., to another SIP server 218, which is setting up the final communication link to the authorized device via connection or via an analogue telephone connection 222. The SIP server being a central component of an Internet protocol private branch exchange (IP PBX) which is arranged to deal with the setup of SIP calls in the network 214, 220. The transmission of video and/or audio is generally performed using another protocol, e.g. real-time transport protocol (RTP), RTSP, SRTP, ZRTP, or similar.

Alternatively, the communication may be entirely computer network protocol based using RTP control protocol (RTCP) and RTP, RTSP, SRTP, SRTCP or ZRTP via the computer network 216, see line 224 in figure. Moreover, the communication with a video managing system may be performed using protocols of the video surveillance system, e.g. using any known API, depicted by line 226 in the figure. In one computer network protocol based implementation the communication between door station 106 and authorized device 202-210 is implemented as peer to peer communication.

Any single one or combination of these or other communications protocols or methods may be implemented in the door station 106.

Figure 3:
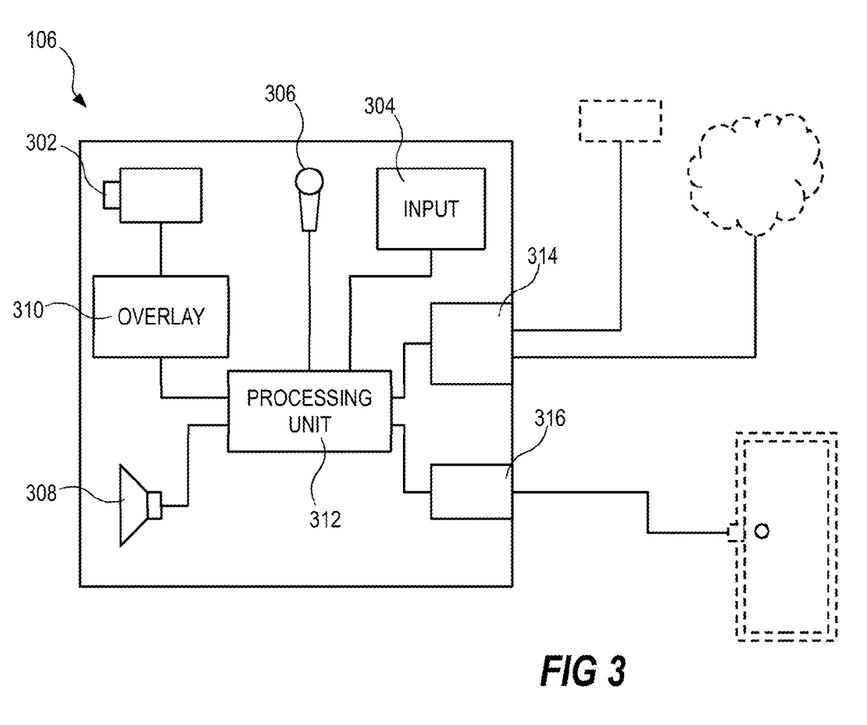
FIG. 3 is a block diagram schematically showing a video capturing device according to one embodiment of invention, in this particular figure the block diagram includes features of a door station.

Now referring to FIG. 3, a door station 106 according to one embodiment of the present invention is depicted. The door station 106 includes a camera 302 arranged to capture moving images of a person in front of the door station 106, and an input device 304 including a request key, a plurality of function keys, and/or a numeric keypad. Further, the door station 106 includes a microphone 306 for capturing sound from the vicinity of the door station 106, a speaker 308 arranged to present audio captured or recorded elsewhere and/or to present audio messages stored in the door station 106, an overlay device 310 arranged to generate a graphic representation of signals received from an authorized device 202-210 and overlay the generated graphic onto the video sent to the authorized device 202-210, a processing unit 312 arranged to implement functions and processes of the door station 106, a communication interface 314 arranged to connect the door station 106 to a communication channel, as disclosed above, for transmission of information to and reception of information from an authorized device 202-210, and a lock interface 316 arranged to send a signal to a lock blocking the passage of an entry in order to change the state of the lock from open to closed or from closed to open.

In one embodiment the signal intended for the lock blocking the passage of entry is sent via the communication interface 314 to an access controller (not shown). The signal is in the form of data sent using the network communication. Then the access controller interprets the communication and generates the signal sent to the passage for instructing the lock to open or to close.

The communication interface 314 includes a network transceiver. There are plenty of transceivers to select from that are known to the skilled person. Various communications protocols may be used, e.g. TCP, UDP, IP, SIP, RTP, RTCP, SIPS, RTSP, SRTP, HTTP, HTTPS, ZRTP, TLS, SRTCP.

The camera 302 may be any camera capturing video and is according to one embodiment arranged so that a person or an object positioned in front of the door station 106 is in the field of view of the camera 302 and, thus, is captured in the video.

The input device 304 may be a single key or button arranged to initiate a sending of a communication request to an authorized device, i.e. initiating sending of a request for a video call via SIP to an authorized device, initiating sending of a request of communication via RTP to an authorized device, etc. In one embodiment the input device 304 alternatively or additionally includes a plurality of keys. For example, the input device 304 may be a key pad that may be used to enter an identity to which the request of communication is to be sent, e.g. a telephone number, an apartment number, an office number, or a code identifying the intended recipient of the request.

The overlay device 310 is a video processing device arranged to translate a received signal or code into a graphical representation and put it on top of the video that is to be sent to the authorized device via the communication transceiver 314. It may be a dedicated device implementing the overlay functionality or it may be a process running on the processing unit 312. The dedicated device may be a hard-wired logic circuit or it may be a programmable device. There may be various video sessions established from the door station 106 with different authorized devices or other devices. Different sessions may get different overlays, e.g. the session of an authorized device entering instructions may get an overlay of symbols or indications of the instruction while another device just displaying the video from the door station gets an video without any overlay. In other words, the overlay may be seen as session specific. The received signal that is to be translated into a graphical representation is received from the authorized device 202-210. For example, if a dual-tone multiple-frequency signal (DTMF signal) representing a person pushing the "4" key on the keypad of an authorized device 202-210, then the overlay device 310 generates a graphical representation of the digit 4 and put it on top of the video to be sent to the authorized device 202. The generation of the graphical representation may be performed in any known way and the superimposing of graphics onto a video stream, i.e. process of applying the graphic onto the outgoing video, may be performed in various ways known to the person skilled in the art. One subset of methods for superimposing graphics into a video stream includes replacing corresponding pixels in each frame with the overlay graphic, e.g. by writing the information into the memory addresses of the corresponding pixels.

The processing unit 312 may be a custom processing unit designed for the door station 106 or a general processing unit configured to control the door station 106 and its functionality. Further, it is configured to recognize and execute instructions received from authorized devices 202-210.

Figure 4:
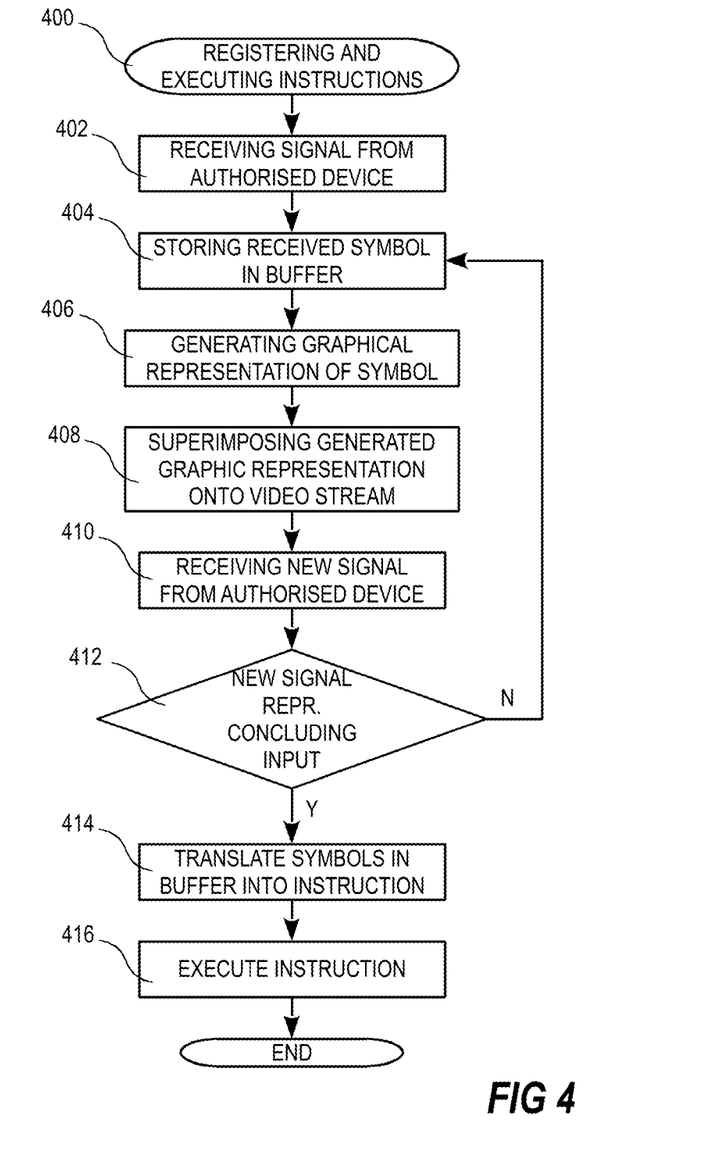
FIG. 4 is a flowchart of a method for registering and executing instructions in a video capturing device according to one embodiment of the invention.

Now referring to FIG. 4, a process 400 for registering and executing instructions in a video capturing device 106, such as a standalone video camera connected to a communication network or a video camera embedded in another device that is connected to a communication network, is described. An example of a device in which a video camera may be embedded in is a door station 106. The process 400 requires that there is an authorized device 202-210 connected to the same communication network 216 as the video capturing device 106. The authorized device 202-210 being a device authorized to control functionality and operation of the video capturing device 106. The process starts with the video capturing device 106 receiving a signal from an authorized device 202-210, step 402, where the signal represents a symbol, which in turn indicates an instruction or part of an instruction entered at the authorized device 202-210. A representation of the symbol is stored in a buffer of the video capturing device, step 404, and the overlay device 310, generates a graphical representation of the symbol, step 406, which it superimposes onto the video currently captured and streamed by the video capturing device 106, step 408. The video stream may be streamed to the authorized device 202-210. However, the video stream may alternatively be streamed to a device that is enabled to present the video visually to the user of the authorized device 202-210, e.g. a standalone network connected display, a computer, a smartphone, etc. It may be advantageous to use such separate display device if the authorized device 202-210 has no display capability and the display device is not authorized and/or is difficult to make an authorized device 202-210 due to the system implemented.

Another signal is received from the authorized device 202-210 after the reception of the initial signal, step 410. This signal is checked, step 412 in order to determine if it represents a concluding input made at the authorized device 202-210. The concluding signal may be defined by the system implementing a predetermined instruction length, i.e. the number of symbols in an instruction, as the last symbol in an instruction. For example in a system having a three symbol instruction length the video capturing device 106 identifies the third inputted symbol as the concluding signal when received. In such an implementation the concluding symbol also is buffered as it is part of the instruction. Alternatively, the concluding signal may be a signal generated and sent by the authorized device from a confirmation input by the operator of the authorized device. In this embodiment the person operating the authorized device have the opportunity to review the entire instruction inputted before the video capturing device executes the instruction. The confirmation signal is generated in response to the user of the authorized device 202-210 being content that the symbols presented in the video stream corresponds to the intended instruction. In a DTMF based signal system the confirmation input may for instance be the hash tag symbol # and, thus, in such embodiment the received signal is checked for a signal representing the hash tag symbol. The rest of the description relating to FIG. 4, is based on the concluding signal being a confirmation signal.

If the signal received is yet another symbol, i.e. not a symbol representing a confirmation input performed at the authorized device 202-210, then the process returns to step 404 where the symbol is buffered together with the previously received symbol/s.

If the signal received is the confirmation signal representing the confirmation input, then the process proceeds to step 414. In step 414 the symbols in the buffer is translated into an instruction of the video capturing device 106. The instruction may comprise one or a plurality of symbols. If the symbols in the buffer does not correspond to any instruction known to the system an error message will be generated and overlaid onto the video stream. Then the instruction is executed and the operation or function requested from the authorized device 202-210 is performed, step 416.

The signal received from the authorized device 202-210 may also be information sent in a data packet over the computer network. For example may the signal be received as a DTMF signal via a SIP INFO packet, an RTP packet, etc.

This method of registering and executing instructions may be especially advantageous in an access system including a door station having a camera. In particular when the authorized device 202-210 is not provided with software applications customized for the door station 106 or when the authorized device 202-210 is a simple device enabled to send signals, e.g. DTMF, and receive the video captured by the camera 302 of the door station 106. As mentioned previously the video may not necessarily be presented on the same device as the one enabling manual input for generating signals to be sent to the door station 106 for providing instructions.

Figure 5:
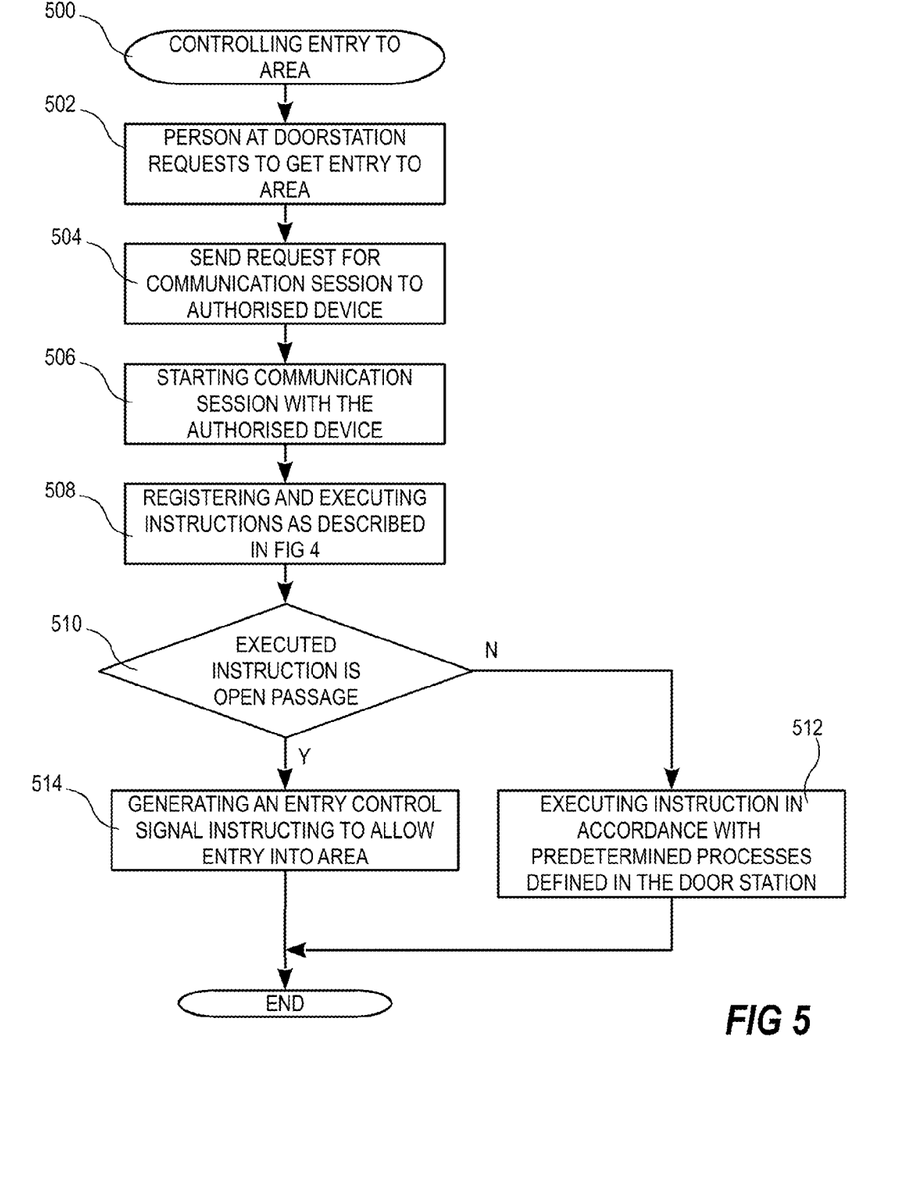
FIG. 5 is a flowchart of a method for executing entry into a specific blocked area according to one embodiment of the invention.

In FIG. 5 there is showed an example of a method for controlling entry to an area by means of a door station 106 and an authorized device 202-210 using the method described in connection with FIG. 4. A person that wants to enter into the specific area arrives at the door station 106 at which the person requests entry to the area by means of interacting with the door station 106, step 502. This interaction by the requesting person results in an input being received at the door station 106. The input may be the requesting person pushing a button on the door station 106, the requesting person keying in an identifier of an authorized device 202-210, etc. In response to the input resulting from step 502 a request for a communication session is sent to an authorized device 202-210, step 504. The request may be sent to a predetermined authorized device 202-210 or it may be sent to an authorized device 202-210 identified in connection with the input in step 502 by the person keying in an identity. Then the authorized device 202-210 accepts the request and the authorized device 202-210 and the door station 106 starts the communication session, step 506. The door station 106 is then registering and executing instructions as described in connection with FIG. 4, step 508. If the instruction executed is not an instruction to open the passage then the door station 106 executes the instruction in accordance with the processes defined in the door station 106, steps 510 and 512. However, if the instruction executed is an instruction to open the passage then the door station 106 generates an entry control signal instructing to allow entry into the area, steps 510 and 514. This signal may be sent directly from the door station 106 to a lock 108 arranged in the passage 110 or the signal may be sent to an access controller arranged to control the opening and locking of the passage 110.

To facilitate the understanding of the present invention an example situation will be described below. The first example relates to a person approaching the entry 110 or blocked passage 110 in order to enter a restricted area. The person approaches the door station 106 arranged in proximity to the blocked passage 110 and pushes a button 304 on the door station 106 in order to have someone unlock and open the blocked passage 110. The button 304 initiates a communication request in the form of a phone call using SIP. The authorized device 202-210, e.g. being a video enabled telephone, may be installed in an office within the perimeter of the restricted area or at a remote location. The answering of the video telephone sets up the communication and the image from the video camera 302 of the door station 106 is displayed on the video telephone 202-204. Now, the person at the door station 106 wanting to enter the area and the person controlling the video telephone 202-204 talks to each other and the person at the door station 106 states his errand. Then the person at the authorized device 202-210 decides if he would like to open the passage 110 or not for the person requesting entry into the area. Let us assume the person at the authorized device 202-210 decides to open the passage. In this example system the digit 1 represents an instruction to open the passage 110 and all instructions should be terminated using hash tag symbol #. The digit 1 is entered at the authorized device 202-210 and shortly thereafter the digit 1 is presented on the screen of the video telephone 202-204 on top of the image of the scene captured by the video camera. The digit is, as described earlier, overlaid at the door station 106 and thereby integrally incorporated into the video stream received at the video telephone 202-204. Thereby the user of the video telephone 202-204 is able to confirm the input made by looking at the display even if the video telephone 202-204 only is able to operate as a telephone and to receive video streams. When the user of the video telephone 202-204 sees on the screen that he has entered the digit 1 and that the door station 106 has received the digit 1 he simply pushes the hash tag key in order to have the door station 106 execute the instruction represented by the digit 1, which in this case was to unlock the passage 110. The door station 106 receives the confirmation signal, i.e. the hash tag, and generates a signal instructing the passage 110 to be unlocked. This signal is then sent to an access control device controlling the lock 108 of the passage 110.

Other instructions sent from the authorized device 202-210 may for example be an instruction making the door station 106 present possible commands, show the latest received instructions as a list of previous instructions, activate devices/accessories connected to I/O terminals on the door station 106, switch light source on or off, mute and unmute the speaker 308, control the direction of the camera, e.g. pan, tilt, and/or zoom, reboot the door station 106, etc.

The instruction for making the door station 106 present a list of possible instructions may be implemented to make the door station generate an overlay on the video stream to be sent from the door station 106 of a list of possible instructions and a short description of the instruction. Hence, the authorized device 202-210 is not required to be customized for a particular system but may serve a plurality of systems. Moreover, this facilitates the operation of various systems by the same operator as the operator easily may get a list of possible instructions presented from the door station 106 itself and therefore may operate different systems having different sets of instructions in a facilitated fashion.

In an alternative embodiment the video capturing device 106 such as a networked motion video camera is controllable from an authorized device 202-210 as described in connection with FIG. 4. Thereby the motion video camera may be controlled, setup, and/or configured from a great variety of devices. Accordingly, the advantage of the device being possible to control from any device enable to send commands and receive video without the use of any special purpose applications makes a system implementing the invention more flexible in that many various devices having basic communication functions may be used for controlling the camera.

What is claimed is:

1. A method for registering and executing instructions in a video capturing device, comprising:
   receiving at a communication interface of the video capturing device at least one signal representing a first input made using an authorized device,
   generating at the video capturing device a graphical representation of the at least one received signal, superimposing at the video capturing device the graphical representation onto video captured by the video capturing device and streamed to the authorized device,
   receiving at the video capturing device, after the at least one signal representing an input made at the authorized device have been received and graphical representations have been generated and superimposed onto video captured by the video capturing device and streamed to the authorized device, a concluding signal representing a concluding input made using the authorized device,
   translating, in response to said concluding input, the received at least one signal into an instruction executable by the image capturing device, and
   executing the instruction resulting from the translation of the at least one signal.

2. The method according to claim 1, wherein the instruction represented by the at least one signal is an operation requested by a user of the authorized device.

3. The method according to claim 1, wherein said received at least one signal represents a symbol inputted by an operator of the authorized device.

4. The method according to claim 2, wherein said received at least one signal represents a symbol inputted by an operator of the authorized device.

5. The method according to claim 3, wherein said superimposing of the graphical representation onto the captured video of the video stream includes changing pixel values for pixels forming the symbol in the video stream.

6. The method according to claim 2, wherein said superimposing of the graphical representation onto the captured video of the video stream includes changing pixel values for pixels forming a visual representation of said requested operation.

7. The method according to claim 1, wherein the received at least one signal and the received concluding signal are in the form of DTMF-signals.

8. The method according to claim 1, wherein a communication session between the video capturing device and the authorized device is a SIP-session (Session Initiation Protocol).

9. A method for controlling entry to an area, comprising:
the method for registering and executing instructions according to claim 1, wherein the video capturing device is a door station,
receiving, at the door station and before receiving at least one signal representing a first input made using the authorized device, an input representing a request for a communication session with an authorized device being authorized to grant entry to the area,
sending to the authorized device, in response to receipt of said input representing a request, a request for setting up the communication session, and
generating an entry control signal in response to the receipt of the at least one signal and the concluding signal from the authorized device.

10. The method according to claim 9, wherein the entry control signal is sent from the door station to a physical access controller controlling entry to said area.

11. The method according to claim 9, wherein the input that is representing a request for a communication session is generated by physical interaction with a device mounted in the door station.

12. The method according to claim 10, wherein the input that is representing a request for a communication session is generated by physical interaction with a device mounted in the door station.

13. The method according to claim 9, wherein the concluding signal received is a confirmation signal received from the authorized device in response to a confirmation input made at the authorized device.

14. A door station, comprising:
a camera for capturing images of person in front of the door station,
an input device for initiating communication with a controlling device,
lock output configured to carry a passage lock signal,
communication transceiver configured to sending video to the controlling device and receiving signals representing an instruction,
a video overlay device configured to generating a graphical representation of a signal received via the communication transceiver and overlay the video to be sent via the communication transceiver with the generated graphical representation, and
an instruction execution device configured to execute a received instruction in response to a concluding signal received at the transceiver, wherein said communication between the door station and the controlling device is a SIP-session (Session Initiation Protocol).

15. The door station according to claim 14, wherein the signal representing an instruction and the concluding signal are in the form of DTMF-signals.

16. The door station according to claim 14, wherein the lock output and transceiver is the same device.

17. The door station according to claim 14, wherein the lock output receives the passage lock signal from the controlling device.

* * * * *